United States Patent [19]

Kawasumi et al.

[11] Patent Number: 5,221,442
[45] Date of Patent: Jun. 22, 1993

[54] METHOD AND APPARATUS FOR ELECTROLYTIC TREATMENT

[75] Inventors: Seiji Kawasumi; Akio Uesugi, both of Shizuoka, Japan

[73] Assignee: Fuji Photo Film Co., Ltd., Kanagawa, Japan

[21] Appl. No.: 843,173

[22] Filed: Feb. 28, 1992

[30] Foreign Application Priority Data

Mar. 7, 1991 [JP] Japan ................... 3-65203
Mar. 29, 1991 [JP] Japan ................... 3-89039

[51] Int. Cl.⁵ .................. C25F 3/04; C25F 7/00
[52] U.S. Cl. .................. 204/129.4; 204/129.43; 204/129.75; 204/228; 204/224 M
[58] Field of Search ........... 204/129.4, 129.43, 129.75, 204/228, 224 M

[56] References Cited

U.S. PATENT DOCUMENTS

| | | | |
|---|---|---|---|
| 3,379,955 | 4/1968 | Koetsch | 321/45 |
| 4,294,672 | 10/1981 | Ohba et al. | 204/129.4 |
| 4,482,434 | 11/1984 | Pliefke | 204/129.4 X |
| 4,548,683 | 10/1985 | Huang et al. | 204/129.4 |
| 5,082,537 | 1/1992 | Stroszynski | 204/129.35 X |
| 5,141,605 | 8/1992 | Nishino et al. | 204/129.4 X |

FOREIGN PATENT DOCUMENTS

| | | |
|---|---|---|
| 914836 | 1/1963 | European Pat. Off. . |
| 2100751 | 1/1983 | European Pat. Off. . |
| 0414189 | 2/1991 | European Pat. Off. . |
| 53-67507 | 6/1978 | Japan . |
| 54-65607 | 5/1979 | Japan . |
| 55-25381 | 2/1980 | Japan . |
| 56-29699 | 3/1981 | Japan . |
| 61-60797 | 12/1986 | Japan . |

*Primary Examiner*—Donald R. Valentine
*Attorney, Agent, or Firm*—Sughrue, Mion, Zinn, Macpeak & Seas

[57] ABSTRACT

In a process of surface-roughening of an aluminum support for a printing plate using an AC electrolytic etching apparatus, changes of the current waveform, particularly changes of the time required for the current to reach its peak value due to variations of the load on the power supply are prevented. Also, the voltage load on the gate turn-off thyristors used for generating an alternating current is prevented from going beyond the withstanding voltage capacity of the thyristors. In accordance with the invention, an electrolytic surface-roughening treatment apparatus is provided in which an alternating current is supplied by a power supply having a circuit for generating the alternating current using a current inversion control circuit so as to perform electrochemical treatment, wherein the electrolytic surface-roughening treatment is performed with either a parallel circuit or a series circuit of a capacitor and a diode bridge inserted in parallel with the load on the power circuit.

25 Claims, 3 Drawing Sheets

METHOD AND APPARATUS FOR ELECTROLYTIC TREATMENT

BACKGROUND OF THE INVENTION

The present invention relates to method and apparatus for electrolytic treatment in which an electrolytic reaction can be controlled in an optimum manner when a metal plate is subject to an electrolytic surface-roughening treatment. The invention particularly relates to an electrolytic treatment apparatus for electrolyzing an aluminum support or substrate for a printing plate.

An aluminum plate (including an aluminum alloy plate) has conventionally been used as a printing-plate support, particularly as a support or substrate for an offset printing plate. Generally, in order to use an aluminum plate as a support or substrate for an offset printing plate, it is necessary that the aluminum plate have a proper adhesion to a photosensitive material and a proper water-retention property.

To this end, it is necessary to perform surface roughening on an aluminum plate so as to make the aluminum plate have a uniformly and densely grained surface. This surface-roughening treatment has a large influence on the printing performance and printing-durability of a plate material when offset printing is actually performed during use. Accordingly, the quality of the surface-roughening treatment has been an important factor in producing printing plate materials.

As a method for roughening a surface of a support or substrate of an aluminum printing plate, an AC electrolytic etching method has been generally employed. For the current used in this method, an AC current of an ordinary sinusoidal waveform, a current of a special alternating waveform such as a square waveform, or the like has been employed. In this AC electrolytic etching method, surface roughening is effected on an aluminum plate, usually with a single treatment, with an AC current and by using a counter electrode, which may be a suitable electrode such as a carbon electrode or the like. In this method, however, the depth of pits is generally so shallow that the printing-durability has been poor.

Accordingly, there have been proposed various methods for the purpose of obtaining aluminum plates having grained surfaces in which pits are formed having a depth larger than can be obtained with the above-described methods and are suitable for printing-plate supports or substrates. Among such methods, there is known a surface-roughening method using an electrolytic power source of a special waveform (see Japanese Patent Unexamined Publication No. Sho. 53-67507), a method wherein the ratio of anode time and cathode time is varied in performing electrolytic surface-roughening using an alternating current (see Japanese Patent Unexamined Publication No. Sho. 54-65607), a method wherein the waveform of the power source is varied (see Japanese Patent Unexamined Publication No. Sho. 55-25381), a method wherein a combination of surface current densities are employed (see Japanese Patent Unexamined Publication No. Sho. 56-29699), and the like.

Further, Japanese Patent Publication No. Sho. 61-60797 describes that it is possible to obtain a uniformly roughened surface by application of an alternating waveform voltage having a quiescent time where the voltage is made zero within each period of at least one of the anode time and cathode time to thereby make the current flow such that the quantity of electricity (total charge transferred) during the anode time is larger than that in the cathode time.

In the case of a printing-plate aluminum support made of a material such as a JIS3003, the support contains a large portion of alloy components. However, changes in the shapes of the alloy grains have been sometimes been caused due to small variations in the alloy components between lots or batches of aluminum plates to thereby cause an uneven printing performance. To solve this problem, recently, the present inventors have proposed an electrolytic treatment method for producing an aluminum support or substrate of a printing plate which is characterized in that the time taken for the current to reach its peak value during the anode time and cathode time is made to fall within a range of from 0.1% to 20% (both inclusive) of $t_F$ and $t_R$, respectively, where $t_F$ and $t_R$ represent the anode time per cycle and the cathode time per cycle, respectively.

To shorten the time taken for the current to reach its peak value, various measures have been attempted, such as reducing the inductive component of the power unit, reducing the inductive component of the load, increasing the resistive component of the load, inserting a resistor in series with the load, and the like.

To reduce the inductive component of the power source or load, the capacity of the power source can be reduced, the size of the electrolytic treatment cell (which is a load) can be reduced, etc. These methods, however, have had a problem in that they are not suitable for mass production.

To increase the resistive component of a load, on the other hand, there has been proposed a method in which a resistor is inserted in series with the load. In this method, however, there has been a problem in that the increase of resistance makes it necessary to increase the power supply voltage, thereby greatly increasing the power cost.

Moreover, there has been a problem that if the load fluctuates, the current waveform is caused to change so as to change the time required for the current to reach its peak value. As a result, the shape of the generated grains is sometimes changed.

In addition, sometimes there has occurred a problem that a gate turn-off thyristor used for generating an alternating current is supplied with a voltage beyond its withstanding voltage so that the power supply fails.

SUMMARY OF THE INVENTION

An object of the present invention is therefore to solve the foregoing problems and to provide method and apparatus for electrolytic treatment which is stable and suitable for mass production and in which it is possible to obtain a roughened surface having deep pits formed uniformly and densely, without excessively increasing costs.

As a result of intense investigations concerning power supplies for generating an alternating current for use in electrolytic treatment, the inventors have produced the present invention.

That is, in order to attain the foregoing object of the present invention, in an electrolytic treatment apparatus for electrochemically treating a material by supplying an alternating current between the material to be treated and a counter electrode in an electrolyte containing metal ions, a surface-roughening treatment is performed using an alternating current generated by a power supply having a circuit in which a capacitor is inserted in parallel with the load in the power circuit, and the alternating current is generated by a current inversion control circuit.

The electrolytic treatment liquid containing metal ions according to the present invention means an electrolytic treatment liquid in which metal ions of the metal to be electrolyzed are mainly contained from the start. In the case of electrolyzing an aluminum plate according to the present invention, it is preferable to make the concentration of aluminum ions contained in the liquid to be 2-20 g/l. This ion concentration has a large influence on the quality of surface-roughening in the electrolytic surface-roughening treatment.

A power supply having an AC inversion control circuit for supplying an alternating current according to the present invention means that a bridge circuit is provided with inverting elements arranged at its four sides so that the inverting elements in the sides opposite to each other form two pairs, and an alternating current is generated in the middle side by alternately turning on/off the two pairs. A gate turn-off thyristor (GTO) may be used as the inverting element.

The insertion of a capacitor in parallel with the load in the power circuit is realized by inserting the capacitor in the middle side of the above-mentioned bridge circuit. The capacitance of the capacitor to be used is selected to be 100-100,000 μF, preferably 1,000-5,000 μF.

In order to further attain the foregoing object of the present invention, in an electrolytic treatment apparatus for electrochemically treating a material by supplying an alternating current between the material to be treated and a counter electrode in an electrolyte containing metal ions, a series connection of a diode bridge and a capacitor is connected in parallel with the load in the power circuit, and a capacitor is connected in parallel with the terminals of the bridge circuit of the diodes. Further, a circuit for detecting a current waveform and a feedback circuit for correcting a difference between a detected waveform and a preset waveform are provided. A voltage determined on the basis of a signal from the feedback circuit is applied between the opposite ends of the capacitor connected in parallel with the terminals of the bridge circuit of the diodes to thereby control the voltage at the middle side of the diode bridge to thus control the GTO current inversion circuit so as to prevent a change of the current waveform due to fluctuations of the current.

DESCRIPTION OF THE PREFERRED EMBODIMENTS

Preferred embodiments of the present invention will be described in detail with reference to the drawings.

Figure 1:
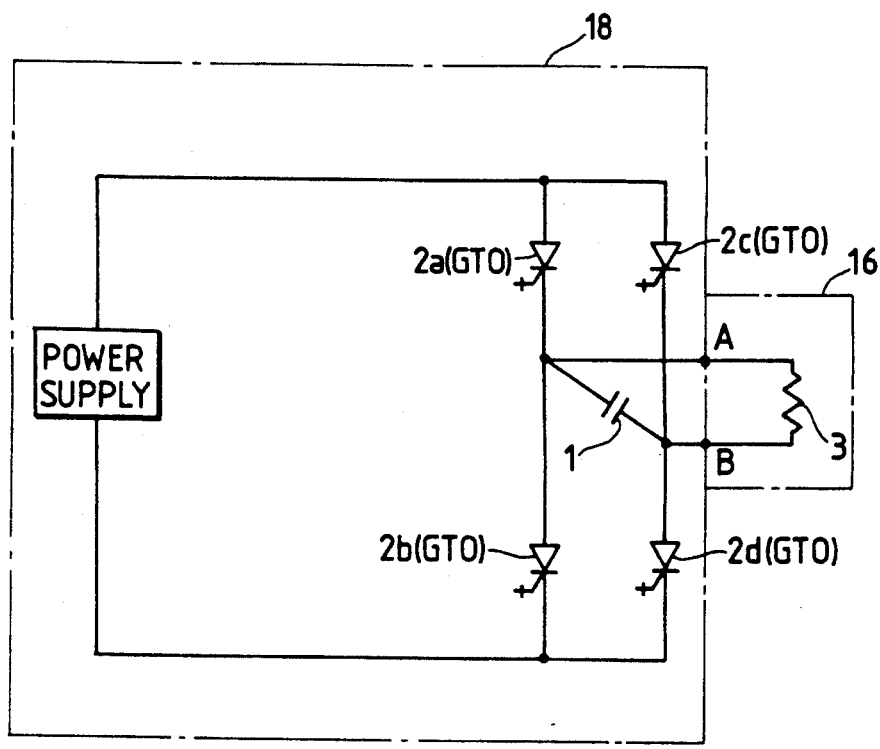
FIG. 1 is a circuit diagram of a power supply used in the electrolytic treatment apparatus according to the present invention.

FIG. 1 is a circuit diagram showing a power supply to be used in the electrolytic treatment apparatus according to the present invention. In FIG. 1, reference numeral 1 designates a capacitor, and reference numerals 2a, 2b, 2c, and 2d designate respective inverting elements. Although a gate turn-off thyristor (GTO element) having a high withstanding voltage is used taking the maximum surge voltage into consideration, the inverting element is not limited to a gate turn-off thyristor. The inverting elements 2a, 2b, 2c, and 2d are provided in the four sides of a bridge circuit so that a pair of inverting element 2a and 2c and a pair of inverting element 2b and 2d in the sides opposite to each other form two respective pairs, and an alternating current is generated across counter electrodes by turning on/off the two pairs alternately on the basis of a gate signal.

By the insertion of a capacitor in the middle side of this bridge circuit, it is possible to remarkably shorten the time taken for the anode current and cathode current to reach their peaks, thereby suppressing fluctuations of the current waveform.

Figure 2:
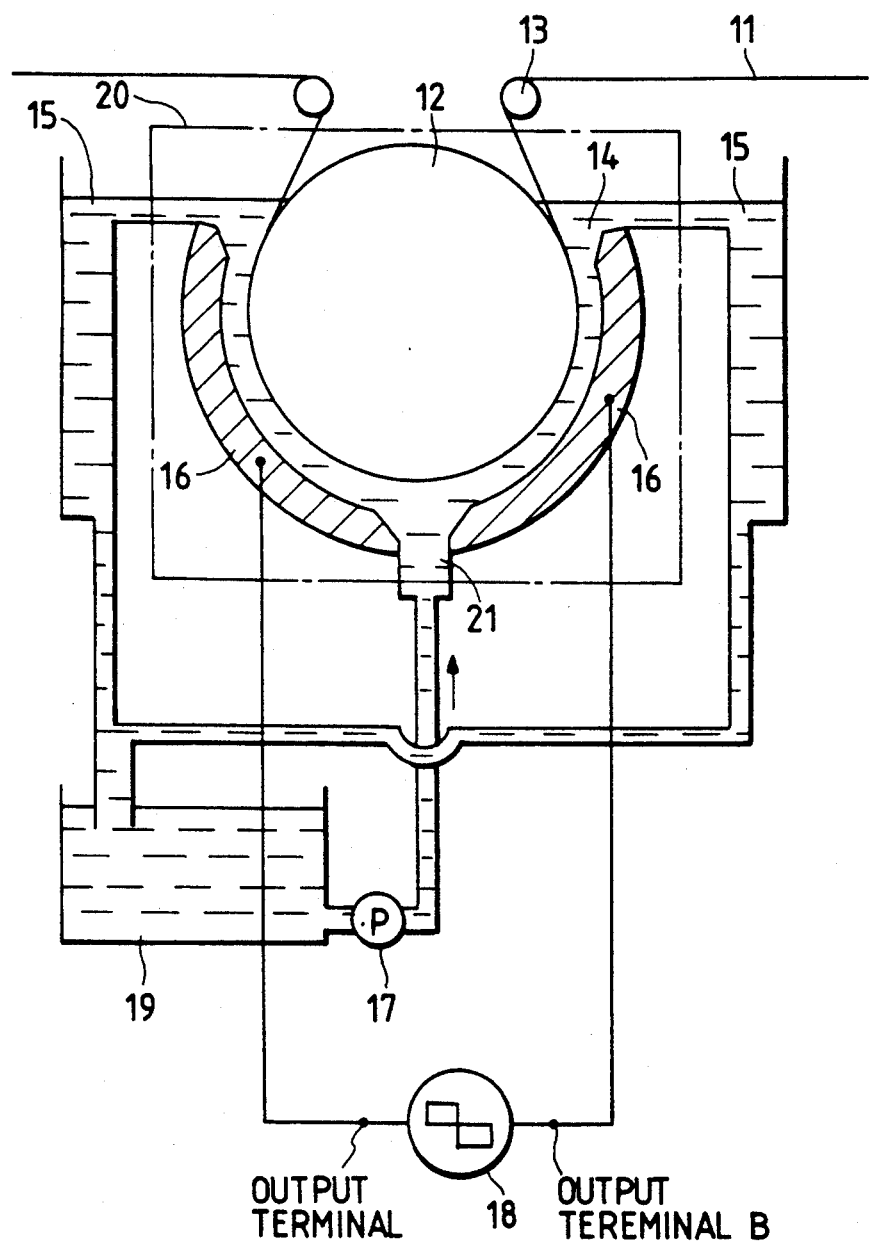
FIG. 2 is a schematic side view showing an electrolytic treatment cell used in a preferred embodiment of an electrolytic surface-roughening treatment apparatus according to the present invention.

FIG. 2 is a schematic side view showing an embodiment of the electrolytic treatment apparatus constructed according to the present invention. In FIG. 2, reference numeral 11 designates an aluminum plate; 12, a drum roll for maintaining a clearance between the aluminum plate and each electrode; 13, pass rolls; and 14, an electrolyte. In the case of roughening the surface of an aluminum plate to be used as a support for a planographic printing plate, an electrolyte mainly containing nitric or hydrochloric acid is used as the electrolyte 14.

Reference numeral 15 designates an outlet for discharging the electrolyte. The liquid level of an electrolytic treatment cell 20 is maintained at a fixed level by keeping the liquid level at the outlet level. Reference numeral 16 designates main counter electrodes. Carbon electrodes are generally used as the main electrodes 16. Further, in order to prevent deterioration of the electrodes, it is preferable to provide auxiliary counter electrodes 22 (not shown) connected in parallel with the main counter electrodes in the power supply. Although various metals such as platinum, lead, and the like can be used for the auxiliary counter electrodes 22, it is desirable to use ferrite electrodes.

Reference numeral 17 designates a pump for pumping a liquid to the electrolytic treatment cell having the main counter electrodes. Devices for measuring physical properties, a controller for controlling temperature, and a filter for removing foreign matter may be provided in the piping after the pump (those components are not illustrated in this drawing).

Reference numeral 18 designates a power supply. The power supply 18 includes the current inversion control circuit (the bridge circuit including the inverting elements 2a, 2b, 2c, and 2d) and the capacitor as described above (illustrated in detail in FIG. 1) so as to supply the electrolytic treatment apparatus with an alternating current. Although the frequency is changed in accordance with required quality, it is desirable to select the frequency to be 15 Hz or more in the case of performing surface-roughening on an aluminum support for a planographic printing plate. Reference numeral 19 designates a stock tank for the electrolyte, the stock tank being supplied with the electrolyte 14 from an electrolyte supply inlet 21 through the pump 17.

The electrolyte to be used in the practice of the present invention mainly contains nitric or hydrochloric acid. In the case of nitric acid, it is desirable that the concentration of the nitric acid be 5–50 g/l, and the concentration of aluminum ions in the electrolytic bath in such a case should be 2–20 g/l. In the case of hydrochloric acid, it is desirable that the concentration of hydrochloric acid be 5–100 g/l, and the concentration of aluminum ions in such a case should be 2–30g/l. Further, in order to perform graining uniformly, it is desirable to satisfy the condition that the current density of the electrolytic current is 10–80 A/dm$^2$, and the electrolytic bath temperature is not lower than 30° C.

Next, a description will be provided in further detail as to a preferred embodiment of the electrolytic treatment apparatus according to the present invention.

First, an aluminum support is alkali-etched prior to the electrolytic treatment according to the present invention. As the alkali agent, it is preferable to use sodium hydroxide, potassium hydroxide, sodium metasilicate, sodium carbonate, sodium aluminate, sodium gluconate, or the like. It is suitable to select the concentration in the range of 0.01% to 20%, the temperature in the range of 20° C. to 90° C., and the treatment time in the range of from 5 sec to 5 min. It is preferable to select the quantity of etching to be in a range of from 0.01 to 5 g/m$^2$.

In the case of using an aluminum support containing a large quantity of impurities such as manganese or the like, it is particularly preferable to select the quantity of etching to be 0.01–1 g/m$^2$.

Since a material (smut) insoluble in alkali may still remain in the surface of the alkali-etched aluminum plate, a desmutting treatment may be performed if necessary.

The pretreatment is carried out as described above. Next, electrochemical surface-roughening according to the present invention is performed using an alternating waveform current in an electrolyte containing metal ions.

A liquid mainly containing nitric or hydrochloric acid is used as the electrolyte containing metal ions according to the present invention. In the case of nitric acid, the concentration thereof is selected to be 3–150 g/l, preferably, 5–50 g/l, and the concentration of aluminum ions contained in the liquid is selected to be not higher than 50 g/l, preferably, 2–20 g/l. In the case of hydrochloric acid, the concentration thereof is selected to be 2–250 g/l, preferably, 5–100 g/l, and the concentration of aluminum ions in such a case is selected to be not higher than 50 g/l, and preferably, 2–30 g/l. Although an additive such as ammonium ions or the like may be added to the nitric or hydrochloric acid, it is difficult to control the liquid concentration or the like in the case of mass production.

Further, it is suitable to select the current density of the electrolytic current to be in a range of 5 to 100 A/dm$_2$, preferably, in a range of 10 to 80 A/dm$^2$. Such conditions are selected at any time in accordance with not only the quantity of electricity, but also the required quality, the components of the aluminum support, and the like.

It may be mentioned that the apparatus for the present invention also may be applied in the manufacture of electrolytic capacitors.

Specific examples of the invention will now be described.

EXAMPLE 1

An aluminum plate made of a JIS1050 material was subjected to a surface-roughening treatment using an electrolytic treatment cell as shown in FIG. 2 and a power supply as shown in FIG. 1. An electrolyte in which the concentration of nitric acid was 10 g/l, the concentration of aluminum ions was 7 g/l, and the temperature was 55° C. was prepared and filled in the electrolytic treatment cell 20 through action of the pump 17. The capacitance of the capacitor in the power supply 18 was selected to be 1000 μF. The quantity of electricity supplied during the anode time was set to 500 coulombs, and the electrolytic surface-roughening treatment was performed at a frequency of 40 Hz.

When the current waveform immediately before the electrolytic treatment cell was observed using an oscilloscope, it was found that the current reached its peak value after 0.3 msec. When pits after the surface-roughening treatment were observed using an electron microscope, it was found that the pits were generated uniformly.

Figure 3:
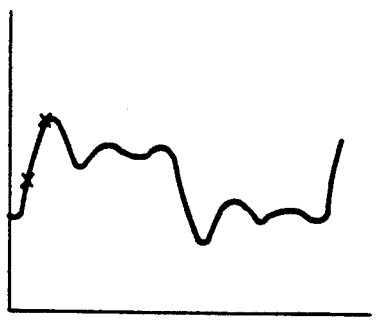
FIG. 3 is a view substituted for a photograph of an image of a current waveform on an oscilloscope when a capacitor of 5,000 μF was used.
Figure 4:
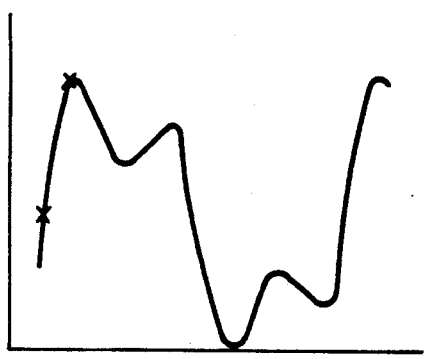
FIG. 4 is a view substituted for photograph of an image of a current waveform on an oscilloscope when a capacitor of 15,000 μF was used.

FIGS. 3 and 4 show views substituted for photographs of images obtained through observation by using an oscilloscope when the capacitance of the capacitor was changed.

EXAMPLE 2

Electrolysis was performed using the same electrolytic treatment cell and electrolyte as those used in Example 1 but under the condition that the capacitor in the power supply was removed. Although the switch for the power supply was turned on to start the electrolysis, the power supply stopped after an elapse of one hour. When examining the cause, it was found that the gate turn-off thyristors (GTO elements) were supplied with a voltage beyond the withstanding voltage capacity thereof.

In the electrolytic treatment apparatus according to the present invention, the time taken for the current to reach its peak value decreases and the electrolytic surface-roughening treatment can be performed with power costs acceptable for mass production and under optimum pit conditions.

A second embodiment of the invention will now be described with reference to FIG. 5.

The power supply having an AC inversion control circuit for supplying an alternating current according to the second embodiment of the present invention fundamentally means a power supply constituted by a bridge circuit provided with inverting elements arranged at the four sides thereof so that the inverting elements in the sides opposite to each other form two pairs, and an alternating current is generated in the middle side by alternately turning on/off the two pairs. A power supply is employed having an AC inversion control circuit designed in a manner so that the middle side (between the counter electrodes) of this bridge circuit is connected to the middle side (between the counter electrodes) of a diode bridge circuit in which a capacitor is connected between the opposite terminals thereof, thus making it possible to control an alternating current waveform on the basis of a voltage applied to across the capacitor.

Next, the power supply to be used according to the second embodiment of the present invention will be described in detail with reference to FIG. 5.

Figure 5:
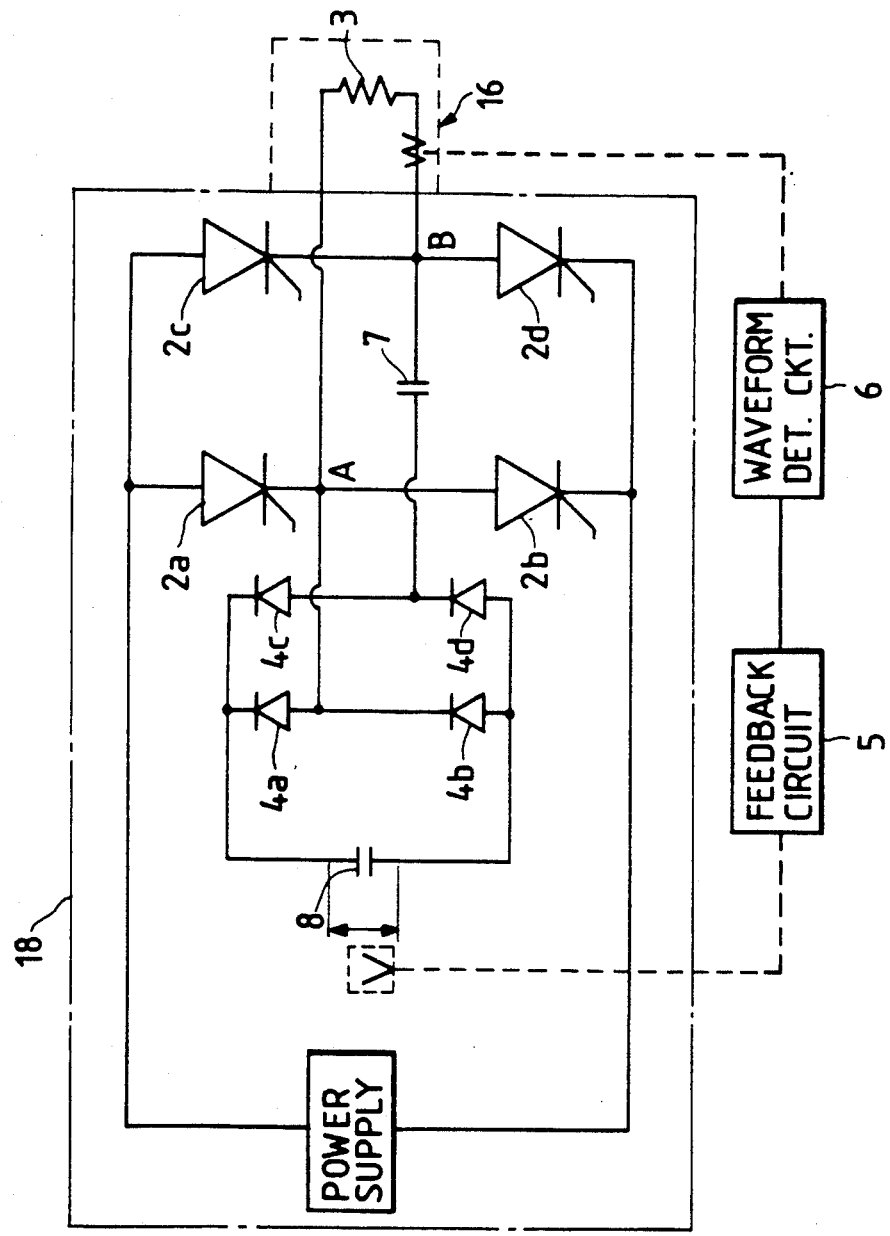
FIG. 5 is a circuit diagram of a power supply unit used in the electrolytic treatment apparatus according to a second embodiment of the invention.

FIG. 5 is a circuit diagram showing the power supply to be used in the electrolytic treatment apparatus according to the present invention. In FIG. 5, reference numerals 7 and 8 designate capacitors, and reference numerals 2a, 2b, 2c, and 2d designate inverting elements. Although a gate turn-off thyristor (GTO element) having a high withstanding voltage is used taking the maximum surge voltage into consideration, the inverting element is not limited to a gate turn-off thyristor. The inverting elements 2a, 2b, 2c, and 2d are provided in the four sides of a bridge circuit so that the inverting elements 2a and 2d and the inverting elements 2b and 2c in the sides opposite to each other form two pairs. An alternating current is generated across counter electrodes by turning on/off the two pairs alternately on the basis of a gate signal.

So that the waveform of an alternating current generated across the counter electrodes does not deviate from a desired preset waveform because of variations of the resistance value of a load 3, the power supply has an AC inversion control circuit in which the waveform of the alternating current in the load 3 is detected by a waveform detection circuit 6, the detected waveform of the alternating current is compared with a preset waveform in a feedback circuit 5, a voltage corresponding to the correction for the difference is fed back from the feedback circuit to the opposite ends of the capacitor 8 (which may be a voltage-controlled capacitor), the voltage across the capacitor 8 is made to correspond to current difference from a predetermined alternating current in a bridge circuit constituted by diodes 4a, 4b, 4c, and 4d, and the current difference is applied to the counter electrodes of the bridge circuit constituted by the GTO elements so that the output current is stabilized as an alternating current approximate to the preset alternating current.

In the power supply having the AC inversion control circuit in which the waveform of an alternating current in the load is detected by the waveform detection circuit and compared with the setting waveform, and in which the output current of the AC inversion control circuit is stabilized as an alternate current approximate to the preset alternating current by feeding back a voltage corresponding to the difference between the detected waveform and the present waveform, the waveform of the output alternating current does not deviate from the setting waveform because of variations of the resistance value of the load.

The above electrolytic treatment apparatus also can be applied to producing electrolytic capacitors.

Specific examples of the second embodiment will now be described.

EXAMPLE 3

An aluminum plate made of a JIS1050 material was subjected to a surface-roughening treatment using a electrolytic treatment cell as shown in FIG. 2 and a power supply as shown in FIG. 5. An electrolyte in which the concentration of a nitric acid was 10 g/l, the concentration of aluminum ions was 7 g/l, and the temperature was 55° C. was prepared and filled in the electrolytic treatment cell 20 by action of the pump 17. A current was passed through the electrolytic treatment cell 20 so that a voltage of 20 V was applied across the capacitor while an electrolytic surface-roughening treatment was performed. The quantity of electricity during the anode time was 500 coulombs, and the electrolytic surface-roughening treatment was performed at a frequency of 40 Hz. When the current waveform immediately before the electrolytic treatment cell was observed using an oscilloscope, it was found that the current reached its peak value after 0.3 msec. When pits after the surface-roughening treatment were observed using an electron microscope, it was found that the pits were generated uniformly.

EXAMPLE 4

An electrolytic surface-roughening treatment was performed using the same electrolytic treatment cell and electrolyte as those used in Example 3 under the same conditions as those in Example 3, except that a voltage of 30 V was applied across the capacitor in the power supply. When the waveform was observed using an oscilloscope, it was found that the current reached its peak value after 3.2 msec. When pits after the surface-roughening treatment were observed using an electron microscope, it was found that uneven pits of a size of 10–20 μm were generated.

What is claimed is:

1. In a method for electrochemically treating a material by supplying an alternating current between said material to be treated and a counter electrode in an electrolyte containing metal ions with a power supply having a circuit for generating said alternating current by means of a current inversion control circuit to thereby perform an electrolytic surface-roughening treatment on said material, the improvement wherein a parallel circuit of a capacitor and a diode bridge is inserted in parallel with load terminals of said current inversion circuit in order to control the voltage supplied to the load.

2. The method of claim 1, wherein said metal ions comprise aluminum ions in a concentration in a range of 2–20 g/l.

3. The method of claim 1, wherein the frequency of said alternating current is approximately 15 Hz or more.

4. The method of claim 1, wherein said electrolyte contains mainly nitric acid.

5. The method of claim 4, wherein the concentration of said nitric acid is in a range of 5–50 g/l, said material comprises an aluminum plate, and said ions comprises aluminum ions in a concentration in a range of 2–20 g/l.

6. The method of claim 1, wherein said electrolyte contains mainly hydrochloric acid.

7. The method of claim 6, wherein the concentration of said hydrochloric acid is in a range of 5–100 g/l, said material comprises an aluminum plate, and said ions comprises aluminum ions in a concentration in a range of 2–30 g/l.

8. The method of claim 1, wherein a current density of said alternating current is in a range of 10–80 A/dm$^2$.

9. The method of claim 1, wherein the temperature of said electrolyte is not lower than 30° C.

10. In a method for electrochemically treating a material by supplying an alternating current between said material to be treated and a counter electrode in an electrolyte containing metal ions with a power supply having a circuit for generating said alternating current by means of a current inversion control circuit to thereby perform an electrolytic surface-roughening treatment on said material, the improvement wherein a series circuit of a capacitor and a diode bridge is inserted in parallel with load terminals of said current inversion circuit in order to control the voltage supplied to the load.

11. The method of claim 10, wherein said metal ions comprise aluminum ions in a concentration in a range of 2-20 g/l.

12. The method of claim 10, wherein the frequency of said alternating current is approximately 15 Hz or more.

13. The method of claim 10, wherein said electrolyte contains mainly nitric acid.

14. The method of claim 10, wherein the concentration of said nitric acid is in a range of 5-50 g/l, said material comprises an aluminum plate, and said ions comprises aluminum ions in a concentration in a range of 2-20 g/l.

15. The method of claim 10, wherein said electrolyte contains mainly hydrochloric acid.

16. The method of claim 15, wherein the concentration of said hydrochloric acid is in a range of 5-100 g/l, said material comprises an aluminum plate, and said ions comprises aluminum ions in a concentration in a range of 2-30 g/l.

17. The method of claim 10, wherein a current density of said alternating current is in a range of 10-80 A/dm$^2$.

18. The method of claim 10, wherein the temperature of said electrolyte is not lower than 30° C.

19. In an electrolytic treatment apparatus for electrochemically treating a material by supplying an alternating current between said material to be treated and a counter electrode in an electrolyte containing metal ions with a power supply having a circuit for generating said alternating current by means of a current inversion control circuit to thereby perform an electrolytic surface-roughening treatment on said material, the improvement wherein a parallel circuit of a capacitor and a diode bridge is inserted in parallel with load terminals of said current inversion circuit.

20. The electrolytic treatment apparatus of claim 19, wherein said capacitor has a capacitance in a range of 100-100,000 μF.

21. The electrolytic treatment apparatus of claim 19, wherein said capacitor has a capacitance in a range of 1,000-5,000 μF.

22. The electrolytic treatment apparatus of claim 19, wherein said current inversion circuit comprises two pairs of gate turn-off thyristors connected in a bridge circuit, said capacitor being inserted across a middle side of said bridge circuit.

23. In an electrolytic treatment apparatus for electrochemically treating a material by supplying an alternating current between said material to be treated and a counter electrode in an electrolyte containing metal ions with a power supply having a circuit for generating said alternating current by means of a current inversion control circuit to thereby perform an electrolytic surface-roughening treatment on s said material, the improvement wherein a series circuit of a capacitor and a diode bridge is inserted in parallel with load terminals of said current inversion circuit.

24. The electrolytic treatment apparatus of claim 23, wherein the improvement further comprises a voltage-controlled capacitor connected across said diode bridge, a waveform detecting circuit for detecting said alternating current, and a feedback circuit connected between said waveform detecting circuit and a control terminal of said voltage-controlled capacitor.

25. The electrolytic treatment apparatus of claim 23, wherein said current inversion circuit comprises two pairs of gate turn-off thyristors connected in a bridge circuit, said series circuit of said capacitor and said diode bridge being inserted across a middle side of said bridge circuit.

* * * * *